(12) United States Patent
Wu et al.

(10) Patent No.: US 7,469,010 B2
(45) Date of Patent: Dec. 23, 2008

(54) EXTRACTING KEY FRAMES FROM A VIDEO SEQUENCE

(75) Inventors: Jing Wu, New South Wales (AU); Alison Lennon, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 473 days.

(21) Appl. No.: 11/339,825

(22) Filed: Jan. 26, 2006

(65) Prior Publication Data
US 2006/0193387 A1  Aug. 31, 2006

Related U.S. Application Data (62) Division of application No. 09/755,068, filed on Jan. 8, 2001, now Pat. No. 7,046,731.

(30) Foreign Application Priority Data
Jan. 30, 2001 (AU) ................................ PQ5352

(51) Int. Cl.
*H04N 7/12* (2006.01)
(52) U.S. Cl. .................. 375/240.16; 348/701
(58) Field of Classification Search ........... 375/240.01, 375/240.16; 348/699, 700, 701; *H04N 7/12*
See application file for complete search history.

(56) References Cited

U.S. PATENT DOCUMENTS 5,995,095 A  11/1999  Ratakonda ............... 345/328

2003/0046581 A1  3/2003  Call et al. ................. 726/22

FOREIGN PATENT DOCUMENTS

| AU | 98/52356 | 11/1998 |
|----|----------|---------|
| EP | 889 652 | 1/1999 |
| GB | 2308774 | 7/1997 |

OTHER PUBLICATIONS

Y. T. Tse, et al., "Global Zoom/Pan Estimation and Compensation for Video Compression", Proc. ICASS-91, vol. 4, Multidimensional Signal Processing, IEEE, Ontario, Canada (1991), pp. 2725-2728.
A. K. Jain, "Fundamentals of Digital Image processing", Prentice Hall, Inc., Englewood Cliffs, N.J. (1989), Contents and pp. 381-390.

*Primary Examiner*—Young Lee
(74) *Attorney, Agent, or Firm*—Fitzpatrick, Cella, Harper & Scinto (57) ABSTRACT

A method of extracting key frames from a video sequence, which video sequence includes MPEG compressed video data having block motion vectors. The method initially partially decompresses (202) the MPEG compressed video data to obtain block motion vectors and converts (204) the block motion vectors to forward block motion vectors. The method then generates (206) global motion signals and generates (306) dominant global direction clusters. The method then selects (402,404,406) potential key frames of the video sequence using the generated dominant global direction clusters. The method lastly decompresses (408) the selected key frames to obtain the extracted key frames.

6 Claims, 9 Drawing Sheets

EXTRACTING KEY FRAMES FROM A VIDEO SEQUENCE

RELATED APPLICATION

This application is a divisional of application 09/755,068, filed Jan. 8, 2001, the entire disclosure of which is hereby incorporated by reference.

TECHNICAL FIELD OF THE INVENTION

The present invention relates generally to extracting key frames from a video sequence. In particular, the present invention relates to a method and apparatus for extracting key frames from a video sequence and to a method and apparatus for generating a representation of a video sequence. The invention also relates to a computer readable medium comprising a computer program for implementing such methods.

BACKGROUND ART

Video cameras have become increasingly popular in recent times. It is a common occurrence for camera users to store one or more video clips on each videocassette or other medium. With the proliferation of video data, there has thus arisen a need for users to organise and manage their video data.

One rudimentary method for organising and managing the video data involves keyword-based searches and fast forward/backward browsing to access the specific portions of a video. However, the keyword-based data retrieval systems can not precisely and uniquely represent video data content. The fast forward/backward operations are extremely slow and inefficient.

Another popular method for accessing specific portions of video clips uses key frames as representative frames extracted from a video sequence. Key frame extraction permits fast video browsing and also provides a powerful tool for video content summarisation and visualisation.

However, video summarisation and visualisation based on the extraction of frames at regular time instances exploits neither shot information or frame similarity. For short important shots, it may not have representatives and for long shots it may have multiple frames with similar content.

Another popular method for producing video summaries is to use cut/change detection to select representative key frames for shots in a movie. A typical approach to select representatives is to use the cut-points as key frames. The key frames are then used as the summary. Typically, the cut-points are determined from colour histograms of the frames. A cut-point is determined when the difference between colour histograms of adjacent frames is greater than a predetermined threshold. However, this method sometimes generates too many key frames, and in many cases (eg. movies, news, reports, etc), the selected key frames can contain many similar frames (eg. of the newsreader).

These histogram techniques are pixel based or block based. Thresholding methods are then employed to determine scene changes. These techniques often produce erroneous results because changes in lighting can cause a shift in colour between successive frames that depict the same scene. Similarly, a camera zoom shot often produces too many key frames.

U.S. Pat. No. 5,995,095 by Ratakonda et al describes a method of hierarchical digital video summarisation and browsing which includes inputting a digital video signal for a digital video sequence and generating a hierarchical summary based on keyframes of the video sequence. The hierarchical summary contains multiple levels, where levels vary in terms of detail (ie. the number of frames). The coarsest, or most compact, level provides the most salient features and contains the least number of frames.

The user may be presented with most compact (coarsest) level summary, ie. the most compact summary. The user then may tag a parent and see the child (ren) frames in finer level. Tagging frames in the finest level result in playback of the video. The method selects the keyframes for inclusion in the finest level of the hierarchy by utilising shot boundary detection. Shot boundary detection is performed using a threshold method, where differences between histograms of successive frames are compared to determine shot boundaries (ie. scene changes). The hierarchical video summarisation method can be performed on MPEG compressed video with minimal decoding of the bitstream. The video summarisation method can optionally and separately determine an image mosaic of any pan motion and a zoom summary of any zoom. However, Ratakonda et al discloses that to incorporate the automatic pan/zoom detect/extract functionality the entire frame bitstream needs to be decoded. Moreover, Ratakonda et al discloses pan and zoom detection methods based on motion vectors based at the pixel level which are computational expensive and inefficient. In addition, Ratakonda et al describes constructing an image mosaic of a panoramic view of the shot frames, which cannot be effectively implemented in real world complex shots, where background/foreground changes or complicated camera effects may appear.

SUMMARY OF THE INVENTION

It is an object of the present invention to substantially overcome, or at least ameliorate, one or more disadvantages of existing arrangements.

According to a one aspect of the invention, there is provided a method of extracting key frames from a video sequence, wherein the video sequence comprises compressed video data having motion vectors; the method comprising the steps of: generating global motion signals based on the motion vectors; generating dominant global direction clusters based on said generated global motion signals; selecting key frames using said generated dominant global direction clusters; and decompressing said selected key frames to obtain said extracted key frames.

According to another aspect of the invention, there is provided a method of generating a representation of a video sequence, wherein said video sequence comprises compressed video data having block motion vectors, the method comprising the steps of: decompressing the compressed video data to obtain said block motion vectors; converting said block motion vectors to forward block motion vectors; generating global motion signals based on the forward block motion vectors; generating dominant global direction clusters based on said generated global motion signals; selecting potential key frames of the video sequence using said generated dominant global direction clusters and a set of predefined rules; removing redundant key frames from said selected potential key frames resulting in remaining selected key frames; and decompressing said remaining selected key frames to obtain said representation of the video sequence.

According another aspect of the invention, there is provided a method of extracting key frames from one or more video clips, wherein each said video clip comprises MPEG compressed video data having block motion vectors, the method comprising the steps of: partially decompressing the MPEG compressed video data to obtain said block motion vectors; converting said block motion vectors to forward block motion vectors; generating a pan global motion signal, a zoom global motion signal, and a tilt global motion signal based on the forward block motion vectors; generating dominant global direction clusters based on said pan, tilt, and zoom generated global motion signals, wherein said dominant global direction clusters comprise one or more of a pan left, pan right, tilt up, tilt down, zoom in, zoom out and global still motion cluster; selecting potential key frames of each said video clip using said generated dominant global direction clusters and a set of predefined rules; removing redundant key frames from said selected potential key frames using a predefined set of heuristic rules resulting in a first set of remaining selected key frames; removing similar and/or repeated key frames from said first set of remaining selected key frames using a colour histogram technique resulting in a second set of remaining selected key frames; and decompressing said second set of remaining selected key frames to obtain said extracted key frames.

According another aspect of the invention, there is provided apparatus for extracting key frames from a video sequence, wherein the video sequence comprises compressed video data having motion vectors; the apparatus comprising: means for generating global motion signals based on the motion vectors; means for generating dominant global direction clusters based on said generated global motion signals; means for selecting key frames using said generated dominant global direction clusters; and means for decompressing said selected key frames to obtain said extracted key frames.

According another aspect of the invention, there is provided apparatus for generating a representation of a video sequence, wherein said video sequence comprises compressed video data having block motion vectors, the apparatus comprising: means for decompressing the compressed video data to obtain said block motion vectors; means for converting said block motion vectors to forward block motion vectors; means for generating global motion signals based on the forward block motion vectors; means for generating dominant global direction clusters based on said generated global motion signals; means for selecting potential key frames of the video sequence using said generated dominant global direction clusters and a set of predefined rules; means for removing redundant key frames from said selected potential key frames resulting in remaining selected key frames; and means for decompressing said remaining selected key frames to obtain said representation of the video sequence.

According another aspect of the invention, there is provided apparatus for extracting key frames from one or more video clips, wherein each said video clip comprises MPEG compressed video data having block motion vectors, the apparatus comprising: means for partially decompressing the MPEG compressed video data to obtain said block motion vectors; means for converting said block motion vectors to forward block motion vectors; means for generating a pan global motion signal, a zoom global motion signal, and a tilt global motion signal based on the forward block motion vectors; means for generating dominant global direction clusters based on said pan, tilt, and zoom generated global motion signals, wherein said dominant global direction clusters comprise one or more of a pan left, pan right, tilt up, tilt down, zoom in, zoom out and global still motion cluster; means for selecting potential key frames of each said video clip using said generated dominant global direction clusters and a set of predefined rules; means for removing redundant key frames from said selected potential key frames using a predefined set of heuristic rules resulting in a first set of remaining selected key frames; means for removing similar and/or repeated key frames from said first set of remaining selected key frames using a colour histogram technique resulting in a second set of remaining selected key frames; and means for decompressing said second set of remaining selected key frames to obtain said extracted key frames.

According another aspect of the invention, there is provided a computer readable medium comprising a computer program for extracting key frames from a video sequence, wherein the video sequence comprises compressed video data having motion vectors; the computer program comprising: code for generating global motion signals based on the motion vectors; code for generating dominant global direction clusters based on said generated global motion signals; code for selecting key frames using said generated dominant global direction clusters; and code for decompressing said selected key frames to obtain said extracted key frames.

According another aspect of the invention, there is provided a computer readable medium comprising a computer program for generating a representation of a video sequence, wherein said video sequence comprises compressed video data having block motion vectors, the computer program comprising: code for decompressing the compressed video data to obtain said block motion vectors; code for converting said block motion vectors to forward block motion vectors; code for generating global motion signals based on the forward block motion vectors; code for generating dominant global direction clusters based on said generated global motion signals; code for selecting potential key frames of the video sequence using said generated dominant global direction clusters and a set of predefined rules; code for removing redundant key frames from said selected potential key frames resulting in remaining selected key frames; and code for decompressing said remaining selected key frames to obtain said representation of the video sequence.

According another aspect of the invention, there is provided a computer readable medium comprising a computer program for extracting key frames from one or more video clips, wherein each said video clip comprises MPEG compressed video data having block motion vectors, the computer program comprising: code for partially decompressing the MPEG compressed video data to obtain said block motion vectors; code for converting said block motion vectors to forward block motion vectors; code for generating a pan global motion signal, a zoom global motion signal, and a tilt global motion signal based on the forward block motion vectors; code for generating dominant global direction clusters based on said pan, tilt, and zoom generated global motion signals, wherein said dominant global direction clusters comprise one or more of a pan left, pan right, tilt up, tilt down, zoom in, zoom out and global still motion cluster; code for selecting potential key frames of each said video clip using said generated dominant global direction clusters and a set of predefined rules; code for removing redundant key frames from said selected potential key frames using a predefined set of heuristic rules resulting in a first set of remaining selected key frames; code for removing-similar and/or repeated key frames from said first set of remaining selected key frames using a colour histogram technique resulting in a second set of remaining selected key frames; and code for decompressing said second set of remaining selected key frames to obtain said extracted key frames.

According to a still further aspect of the invention, there is provided a video summary produced by any one of the methods described above.

BRIEF DESCRIPTION OF THE DRAWINGS

A number of preferred embodiments of the present invention will now be described with reference to the drawings, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

Video camera users often pan and zoom from one location to another to show the connection of different places and events and hold the camera still to focus on an important event or something particular interest to them. The key frame extraction method in accordance with the embodiment is based on dominant global direction clusters of camera motion estimated from compressed video data. The method takes advantage of the fact that the incoming video is already in compressed form. The advantage is that computational cost of fully decompressing every frame is not necessary. Only a selected number of key frames need be decompressed at the end of the process. The method also attempts to capture user's interests and some important events. It gives a reasonable number of efficient and effective key frames depending on the video complexity.

The principles of the preferred method described herein have general applicability to a method of extracting key frames from a video sequence. However, for ease of explanation, the steps of the preferred method are described with reference to video clips. A video clip is defined as that section of video between record-start and record-end capture event. However, it is not intended that the present invention be limited to the described method. For example, the invention may have application to commercial movies and the like having many such clips. This method is also applicable to motion-compensated predictive compressed video such as MPEG2. However, it is not intended to be limited thereto. Any compressed video sequences incorporating motion vectors would be suitable.

Figure 1:
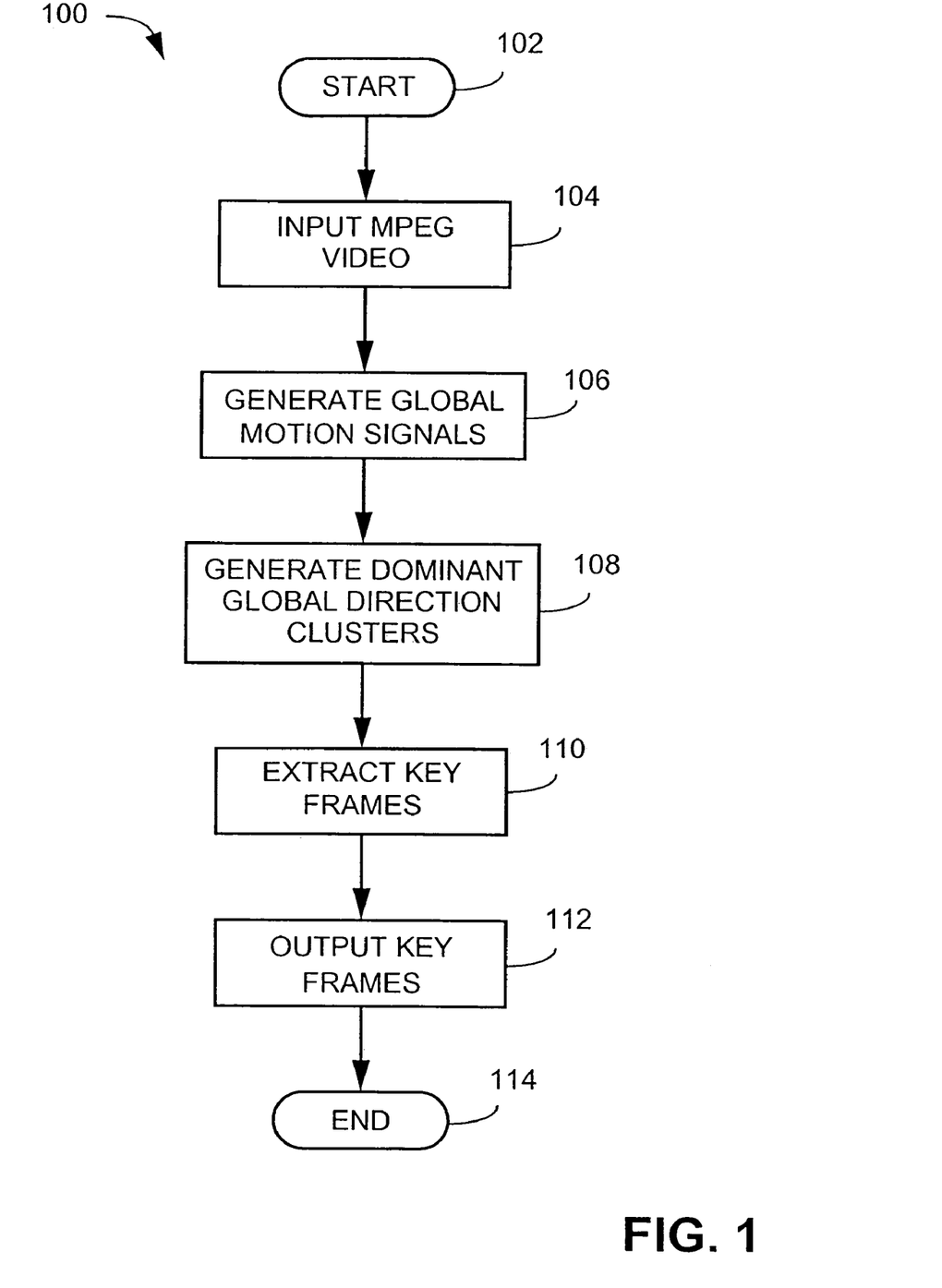
FIG. 1 is a flow diagram of an overview of a method of extracting key frames from a video sequence in accordance with a first embodiment.
Figure 5A:
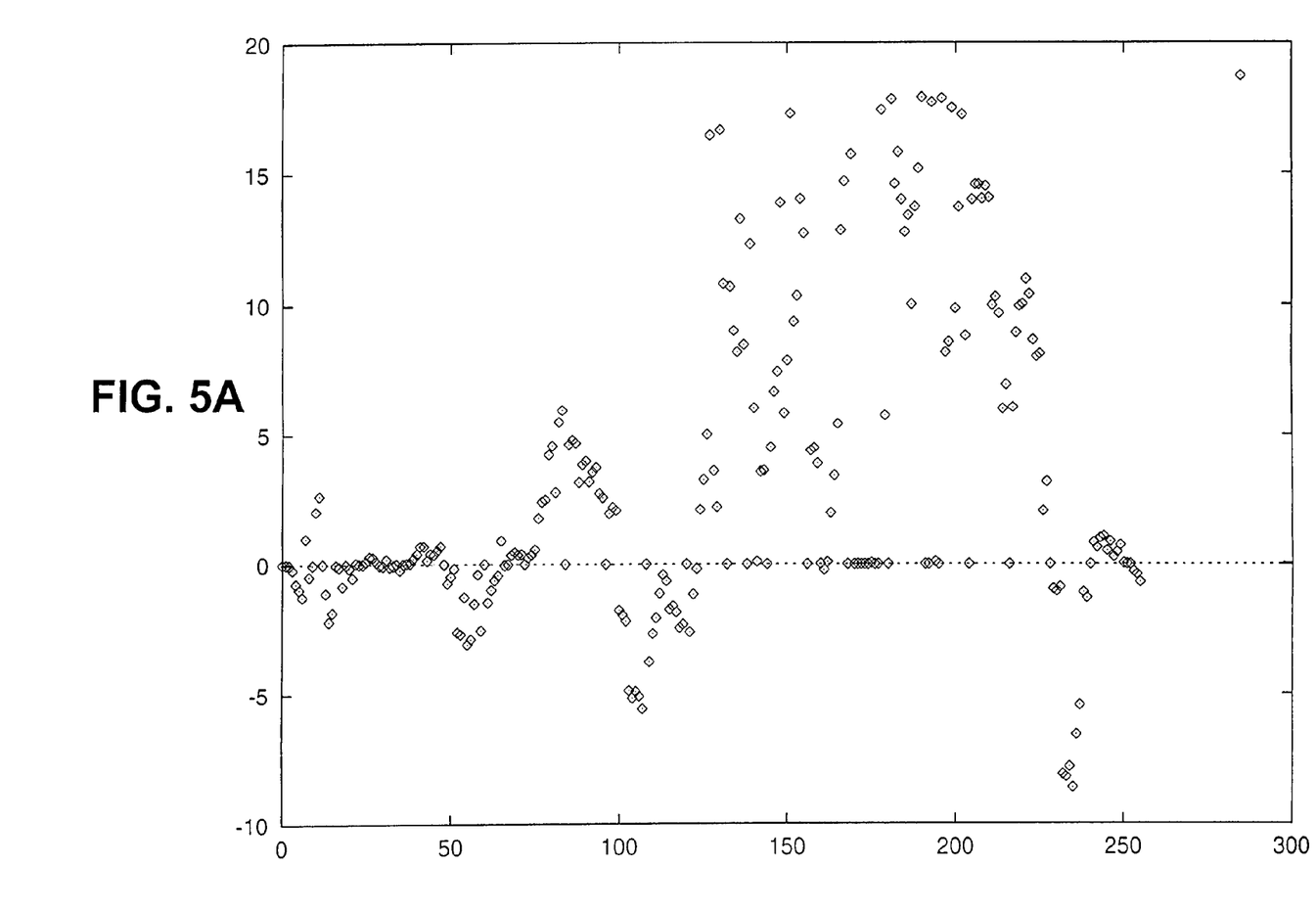
FIG. 5A is a graph of the (pan) global motion signal x(t) for an exemplary video sequence.
Figure 5B:
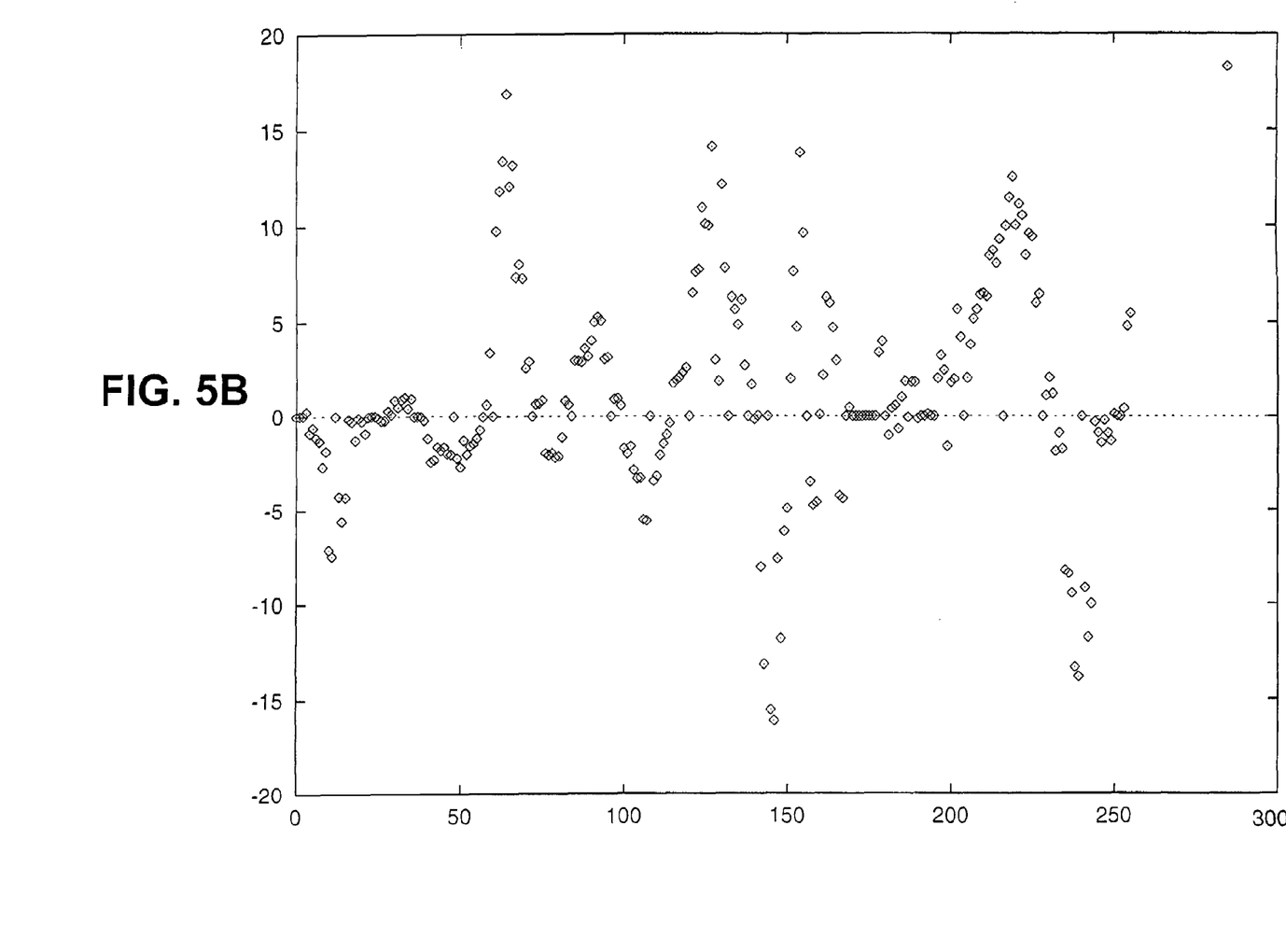
FIG. 5B is a graph of the (tilt) global motion signal y(t) for the same exemplary video sequence used in FIG. 5A.
Figure 5C:
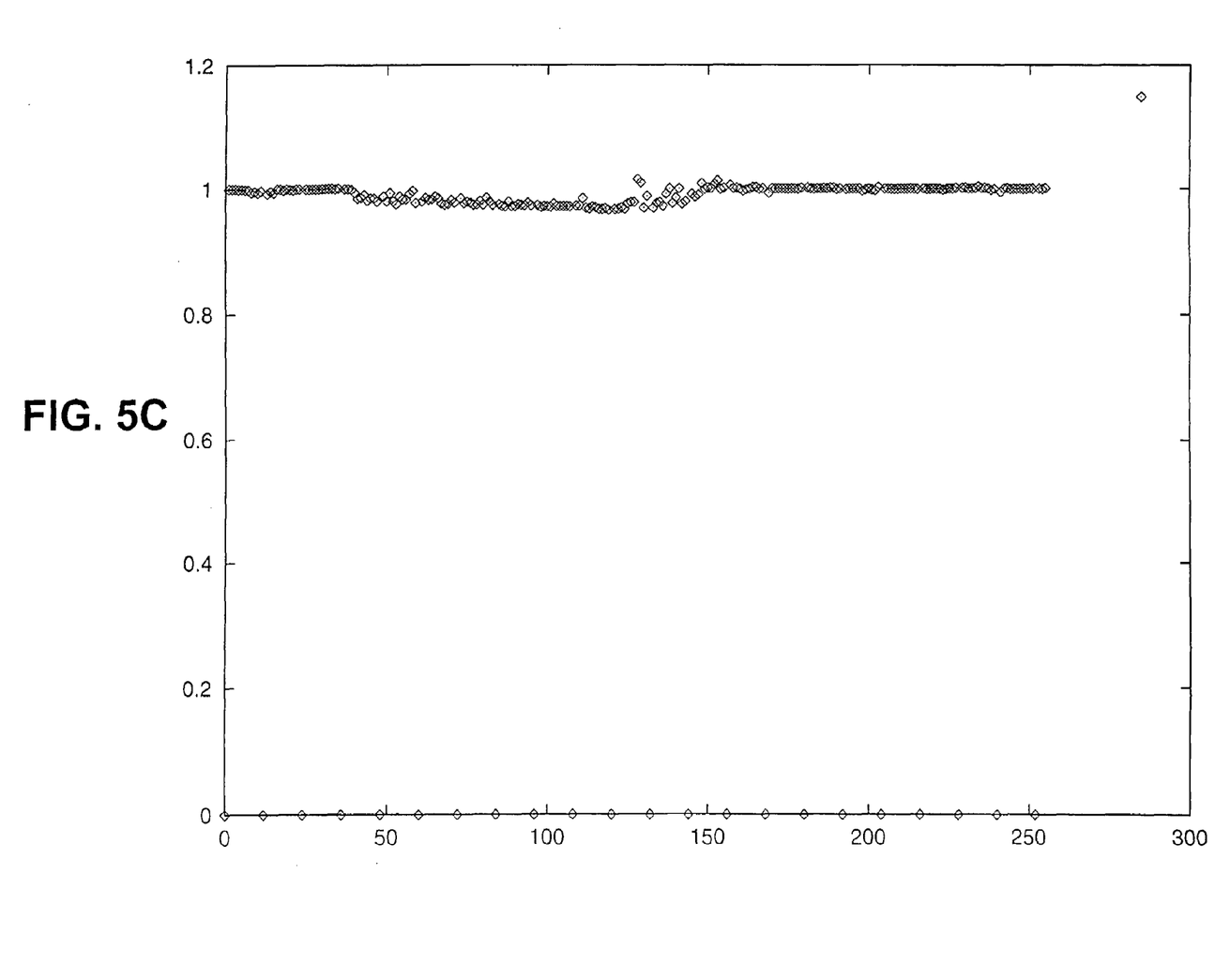
FIG. 5C is a graph of the (zoom) global motion signal z(t) for the same exemplary video sequence used in FIG. 5A.

Turning now to FIG. 1, there is shown a flow diagram of an overview of a method of extracting key frames from a video clip in accordance with a first embodiment. The key frame extraction method 100 commences at step 102 where any necessary parameters are initialised. The method 100 continues to step 104 where a MPEG2 compressed video clip is input for processing by the method 100. The method 100 then generates global motion signals of the video clip. These global motion signals comprise global motion parameters for most frames of the video clip. These global motion parameters comprise a pan parameter, a tilt parameter, and a zoom parameter for each available frame of the video clip. The global motion signals comprise these parameters as a function of time for the whole video sequence. For example, FIGS. 5A to 5C show graphs of the global motion signals for an exemplary video sequence. The manner in which these global motion signals are generated is described in more detail below.

Figure 5D:
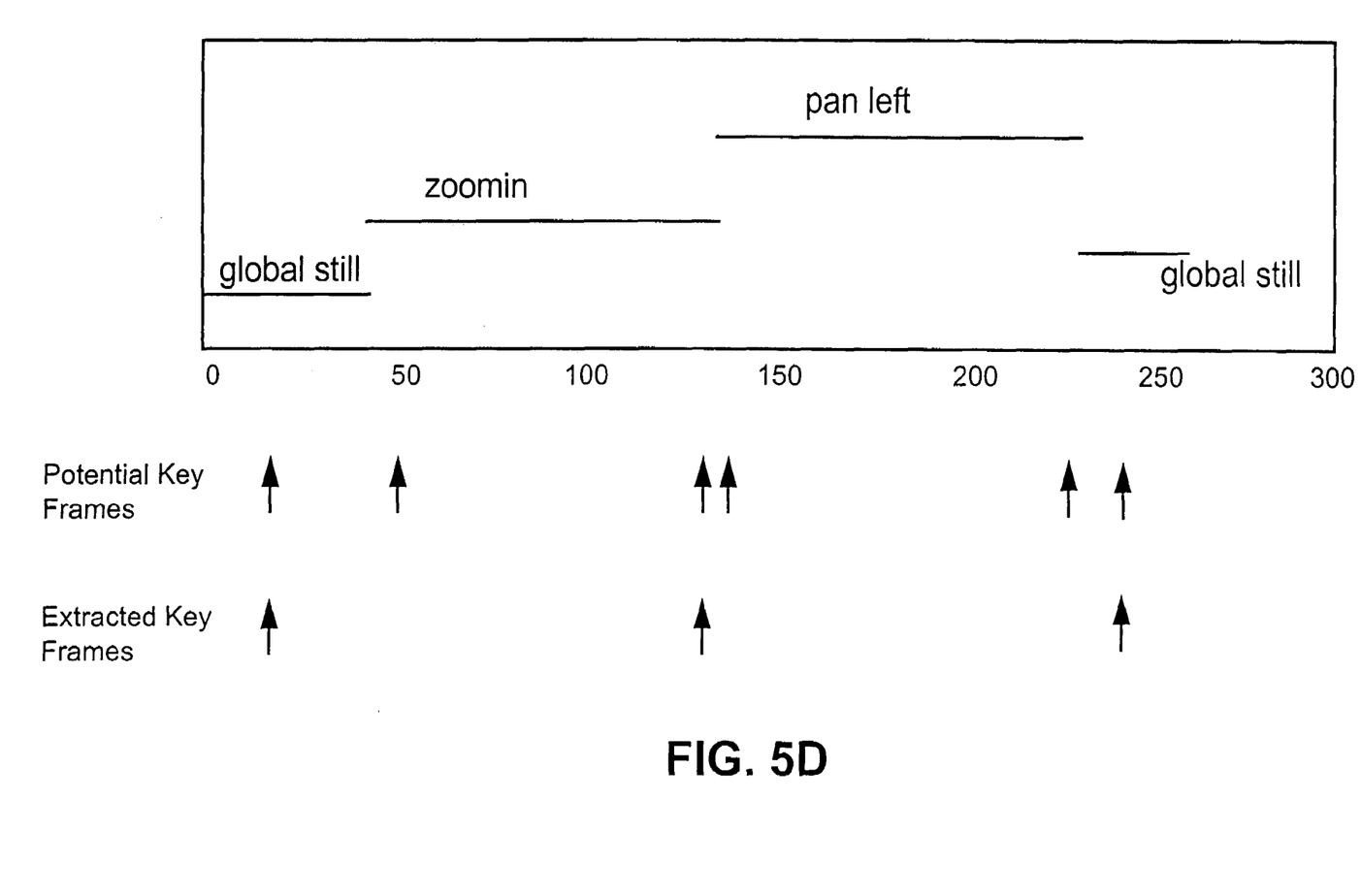
FIG. 5D is a graph of the dominant global direction clusters as a function of time, the potential key frames, and the generated key frames of the same exemplary video sequence used in FIG. 5A.

After step 106, the method proceeds to step 108, where the method generates clusters of the dominant direction of the global motion for the entire video sequence (herein called "dominant global direction clusters"). During this step 108, the method takes as input all three global motion signals for each available frame and determines the dominant direction of the global motion signal for that frame. The dominant direction for a frame can either be pan left, pan right, tilt up, tilt down, zoom in, zoom out and global still. The dominant directions of all available frames are then clustered together to form the dominant global direction clusters for the whole video sequence. For example, FIG. 5D is a graph of the dominant global direction clusters as a function of time (viz frame number) of the same exemplary video sequence as used in FIG. 5A. As can seen from FIG. 5D, the video sequence is segmented into clusters beginning at frame number=0 with a global still cluster, then a zoom in cluster, pan left cluster, and lastly a global still cluster. The manner in which these dominant global direction clusters are generated is described in more detail below.

After step 108, the method proceeds to step 110, where key frames are extracted from the video sequence. During this step 110, a number of potential key frames are selected from dominant global direction clusters using a set of predefined rules. The method then removes redundant potential key frames and finally fully decodes the remaining resultant key frames. The manner in which these key frames are extracted is described in more detail below. The method then outputs the decoded key frames as a summary of the video sequence.

Figure 2:
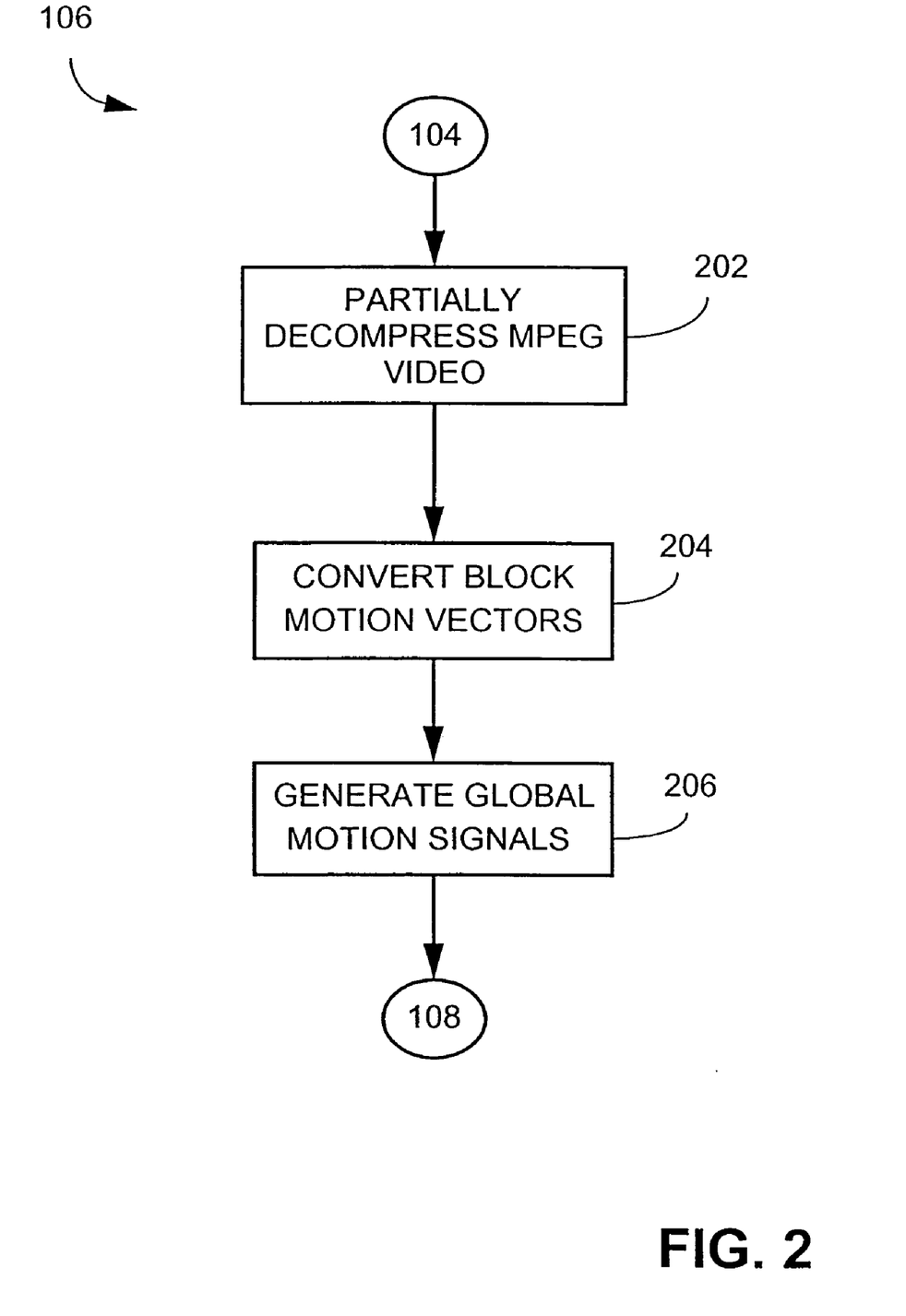
FIG. 2 is a flow diagram of the sub-steps of step 106 of the method shown in FIG. 1.

Turning now to FIG. 2, there is shown in more detail a flow diagram of the sub-steps of step 106 of the key frame extraction method of FIG. 1. After the MPEG2 video sequence has been input 104, the method proceeds to step 202. During this step 202, the MPEG2 compressed video sequence is partially decompressed in a known manner to obtain all the MPEG2 block motion vectors of the video sequence.

The MPEG2 compression standard for moving images exploits both spatial and temporal redundancy of video sequences. MPEG2 utilises a number of modes of compression. One mode is called intraframe coding, wherein a number of pictures of the video is individually and independently compressed or encoded. Intraframe coding exploits the spatial redundancy that exists between adjacent pixels of a picture. Pictures encoded using only intraframe encoding are called I-pictures. MPEG2 utilises another mode called interframe coding, which exploits the temporal redundancy between pictures. Temporal redundancy results from a high degree of correlation between adjacent pictures.

MPEG2 exploits this redundancy by computing an interframe difference signal called the prediction error. In computing the prediction error, MPEG2 has adopted a macroblock approach for motion compensation. A target macroblock in a frame to be encoded is matched with a most similar displaced macro-block in a previous (or consecutive) frame, called a reference image. A (block) motion vector that describes a displacement from the target macro-block to the prediction macro-block indicates the position of the best matching macro-block, or prediction macro-block. The (block) motion vector information is encoded and transmitted along with compressed image frames. In forward prediction, a target macro-block in the picture to be encoded is matched with a set of displaced macro-blocks of the same size in a past picture called the reference picture. A (block) motion vector that describes the horizontal and vertical displacement from the target macro-block to the prediction macro-block indicates the position of this best matching prediction macro-block. Pictures coded in MPEG2 using forward prediction are called P-pictures.

The MPEG2 compression standard also uses bi-directional temporal prediction. Pictures coded with bi-directional prediction use two reference pictures, one in the past and one in the future. A target macro-block in bi-directionally coded pictures can be predicted by a prediction macro-block from the past reference picture (forward prediction), or one from the future reference picture (backward prediction), or by an average of two prediction macro-blocks, one from each reference picture (interpolation). In every case, a prediction macro-block from a reference picture is associated with a motion vector, so that up to two motion vectors per macro-block may be used with bi-directional prediction.

During this step 202, the key frame extraction method decompresses the video sequence to obtain all the MPEG2 block motion vectors of the video sequence. The method does not fully decode the sequence, it does not undertake any interframe decoding during this step. It will be appreciated to a person skilled in the art not all frames are partially decoded. Namely, not all frames have motion block vectors.

After the method has partially decompressed 202 the MPEG2 video sequence, the method proceeds to step 204. In this step 204, the method converts all the backward (block) motion vectors to forward (block) motion vectors, which basically requires just a change of reference and direction. These forward (block) motion vectors are representative of local displacement vectors from which global motion can be calculated.

The method then continues to step 206, where the method calculates three global motion parameters for each available frame that comprise forward motion vectors. These global motion parameters are calculated from the forward motion vectors of a frame using the method described in "Global Zoom/Pan estimation and Compensation for video Compression" from Proc ICASSP91 by Yi Tong Tse and Richard Baker, pages 2725 to 2728. Three global parameters are computed, x as pan parameter, y as tilt parameter and z as zoom parameter. The global motion parameters are calculated for each available frame. Three global motion signals, X=x(t), Y=y(t) and Z=z(t), are then formed from these global parameters as a function of time for the video sequence. Examples of such generated global motion signals are shown in FIGS. 5 (*a*)-(*c*).

Turning now to FIG. 5A, there is shown a graph of the (pan) generated global motion signal x(t) for an exemplary video sequence. The horizontal axis represents the number of frames of the video sequence from frame numbers zero to frame number 260. The vertical axis is the pan parameter x varying from −10 pixels to +20 pixels. It has been found that a pan parameter x=−10 to +10 is generally indicative of little pan movement. A pan parameter x of over 10 is indicative of a pan left movement. A pan parameter x of less than −10 is indicative of a pan right movement. As can be seen, there is a left pan movement from about frame number 130 to 230 during the video sequence.

Turning now to FIG. 5B, there is shown a graph of the (tilt) generated global motion signal y(t) for the same exemplary video sequence used in FIG. 5A. Similar to FIG. 5A, the horizontal axis represents the number of frames of the video sequence from frame numbers zero to frame number 260. The vertical axis is the tilt parameter y varying from −20 pixels to +20 pixels. It has been found that a tilt parameter y=−10 to +10 is generally indicative of little tilt movement. A tilt parameter y of over 10 is indicative of a tilt up movement. A pan parameter y of less than −10 is indicative of a tilt down movement. As can be seen, there are short tilt movements at about frame numbers 60, 125, 150, 160, 220 and 240 during the video sequence.

Turning now to FIG. 5C, there is shown a graph of the (zoom) generated global motion signal z(t) for the same exemplary video sequence used in FIG. 5A. Similar to FIG. 5A, the horizontal axis represents the number of frames of the video sequence from frame numbers zero to frame number 260. The vertical axis is the zoom parameter z varying from 0 to 1.2 zoom factor. It has been found that a zoom parameter z=0.98 to 1.02 is generally indicative of little zoom movement. A zoom parameter z of over 1.02 is indicative of zoom out movement and a zoom parameter z of less than 0.98 is indicative of zoom in movement. As can be seen, there is a zoom in movement from about frame number 40 to 140 during the video sequence.

Figure 3:
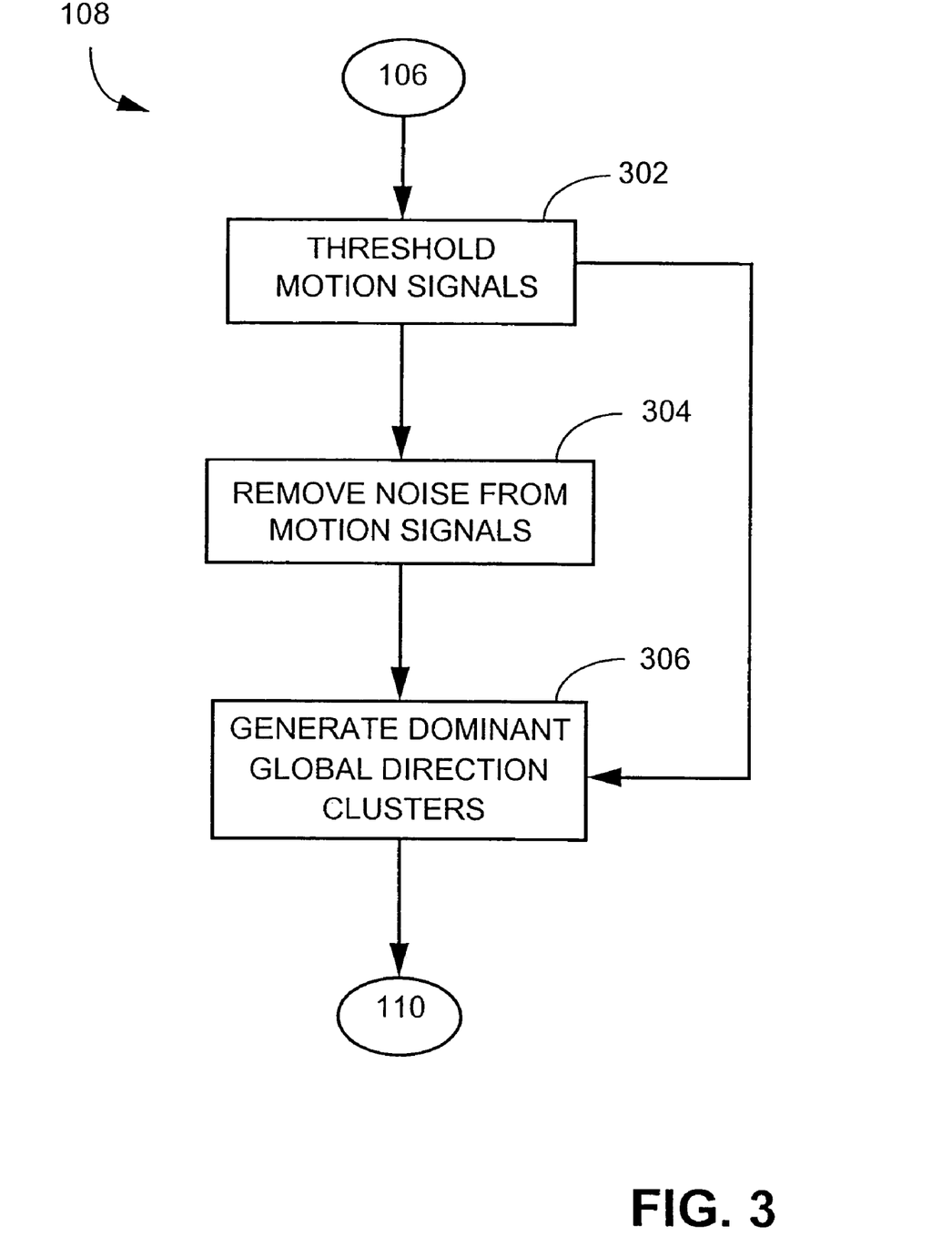
FIG. 3 is a flow diagram of the sub-steps of step 108 of the method shown in FIG. 1.

Turning now to FIG. 3, there is shown in more detail a flow diagram of the sub-steps of step 108 of the method shown in FIG. 1. After the key frame extraction method computes 206 the global motion signals, the method then proceeds to step 302. During step 302, the method thresholds each of the global signals. That is the key frame extraction method converts each global parameter of each available frame to one of three discrete global parameter values +1, 0, −1. For example, in the case of the global pan parameter x, if −10<=x<=+10 convert x to 0; otherwise if x>10 convert x to 1, otherwise if x<−10 convert x to −1. Similarly for the global tilt parameter y. In the case of the global zoom parameter z, if 0.98<=z<=1.02 convert z to 0; otherwise if z<0.98 convert z to −1, otherwise if z>1.02 convert z to +1.

After the thresholding step 302, the method continues to step 304, where noise is removed from the discrete global motion signals. The noise is removed from the discrete global motion signals using known techniques of morphological processing where the discrete global parameters are reduced to a more revealing shape. This technique removes short transient spikes and fills in any holes in the discrete global motion signals. See "Fundamentals of Digital Image Processing" by A. K. Jain, page 384, which describes the basic operations of morphological processing. After step 304 the method continues to step 306.

During step 306, the key frame extraction method generates dominant global direction clusters based on the noise reduced discrete global motion signals over the video sequence. The method takes as input all three noise reduced discrete global motion signals for each available frame and determines the dominant direction of the global motion signal for that frame. The dominant direction for a frame can either be pan left, pan right, tilt up, tilt down, zoom in, zoom out and global still. The dominant directions of all available frames are then clustered together to form the dominant global direction clusters for the whole video sequence. For example, the 'global still' motion captures the camera still and/or small local object motion, viz all the discrete global motion values for that frame that are close to or equal to zero. In the example of a pan left motion, the discrete global motion values for a frame are (pan=1, zoom=0, tilt=0). If however, combined motions exist for a frame (e.g. discrete global signals pan=1, zoom=1, tilt=0), then the dominant direction of the global motion is the largest one of the three original global motion signals computed during step 206. In the latter case, a comparison is made to determine the largest original global motion signal in a frame. Preferably, the original global motion signals are first averaged over time to remove any transients prior to the comparison. As can be seen from FIGS. 5(*a*) to 5(*c*), the zoom global parameter has a different metric than the tilt or pan global parameters. The zoom global motion signal may be normalised so that a direct comparison can be made with the tilt or pan global motion parameters in order to determine the dominant direction of the global motion. Once the dominant direction of the global motion for each frame is determined, these dominant directions may be grouped together to form clusters. As mentioned previously, these are called herein dominant global direction clusters. The clustering sub-step groups the same type of consecutive and close clusters. Very short motion segments are ignored.

Turning now to FIG. 5D, there is shown a graph of the dominant global direction clusters as a function of time (viz frame number) of the same exemplary video sequence used in FIG. 5A. As can be seen, there is global still cluster from frame number zero to 40. During this time, there is no dominant global motion and the video sequence is relatively stationary. There is a zoom in cluster during frame numbers 40 to 130. During this time the dominant global motion is a zoom in. Following the zoom in cluster, there is a pan left cluster during frame number 130 to 230. During this duration the dominant global motion is a pan left. The last cluster is a global still cluster from frame numbers 230 to 260. During this period, there is no dominant global motion.

Returning now to FIGS. 5A to 5C, there can be seen that the pan left movement and zoom in movement overlap during the period from frame numbers 130 to 140. The key frame extraction method determines the dominant global motion during this period is pan left. It also can be seen that the tilt movements at about frame numbers 60, 125, 150, 160, and 220 overlap both the pan left and zoom in movements. However, the tilt motion segments are short and the key frame extraction method ignores them during the clustering.

Figure 4:
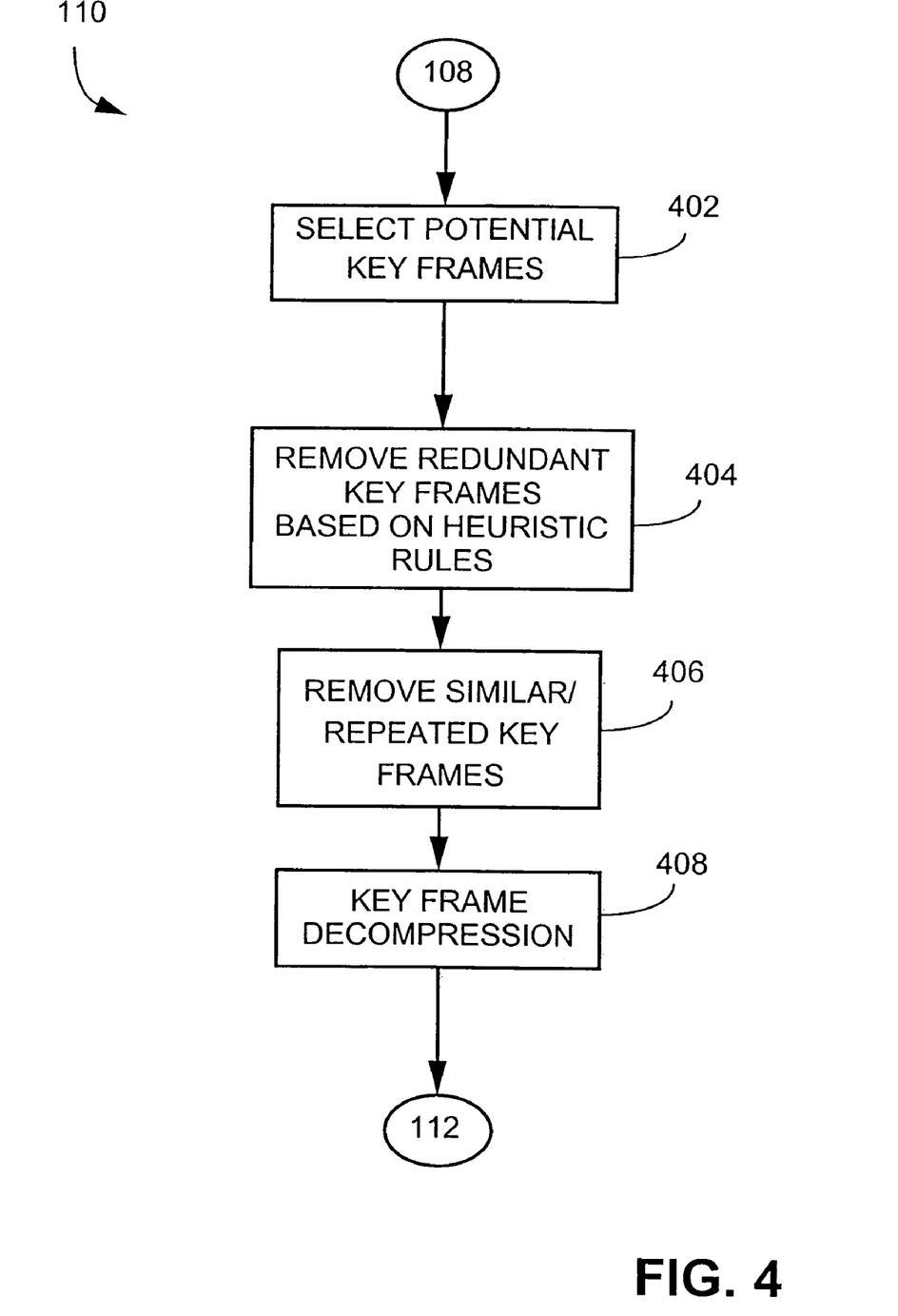
FIG. 4 is a flow diagram of the sub-steps of step 110 of the method shown in FIG. 1.

Turning now to FIG. 4, there is shown a flow diagram of the sub-steps of step 110 of the key frame extraction method of FIG. 1. After the dominant global direction clusters have been determined 306, the method proceeds to step 402. During this step 402, potential key frames are selected from the dominant global direction clusters. They are not extracted from MPEG2 compressed video at this stage. They are selected in accordance with the following predefined set of rules:

- One or more frames are selected for a pan or tilt cluster depending on the length and speed of the pan or tilt.
- One or more frames are selected for a zoom cluster depending on the zoom factor and length of the zoom.
- Only one frame is selected for each global still cluster.

For example, the potential key frames selected from a pan cluster can be at the start of pan, the middle of the pan and the end of the pan or only one potential key frame from start of pan depending on the length and speed of the pan cluster.

Returning now to FIG. 5 (*d*), there is shown potential key frames selected for the video sequence used in FIGS. 5 (*a*) to (*c*). In this example, there is one key frame selected for the first global still cluster; two key frames selected for the zoom in cluster at the beginning and end of the zoom in cluster; two key frames selected at the beginning and end of the pan left cluster; and one key frame selected for the last global still cluster.

After step 402, the method proceeds to step 404. In step 404, redundant key frames of the selected key frames 402 are removed based on a set of predefined heuristic rules that take into account photographic habits. For instance, global still is more important than other motion clusters. It often captures user's interest or some particular event. It also sometimes captures more focused images than moving images. Some of these heuristic rules that may be applied are:

- A potential key frame selected at the beginning/end of a cluster which is not a "global still" is removed if it follows/is followed by a "global still" cluster. For example, a potential key frame selected at the end of a "zoom in" cluster is removed when it is followed by a "global still" cluster. The key frame selected from a "global still" often have better quality than the one extracted from the end of "zoom in" cluster and they are similar.
- A potential key frame selected at the beginning of a pan/tilt is removed if it follows a zoom cluster. For example, a "zoom in" cluster is followed by a very short ignored motion segment and then followed by a "pan right" cluster. The potential key frame from beginning of the "pan right" is removed. However, the set of heuristic rules are not limited to these rules of use.

The method then proceeds to step 406, where the method removes similar and/or repeated key frames of the selected key frames remaining after step 404. Notwithstanding the use of the predefined heuristic rules, scenes are still sometimes repeated and similar key frames may happen in different time. This step 404 removes these similar key frames by using image similarity measurement. Existing methods of measuring image similarity (eg. colour histogram comparison) can be used. In computing the colour histograms, the closest I frames in the MPEG2 video can used as the key frames instead of P or B frames. Then the DC coefficients of the MPEG2 compressed image can be used to generate a low-resolution image. The image similarity measure can be performed using the DC key frame images.

After step 406, the method proceeds to step 408, where the selected key frames still remaining from step 406 are fully decoded from the MPEG2 video sequence. These decoded remaining key frames form a summary of the MPEG2 video sequence and are output 112 (e.g. stored on hard disk). The method then terminates at step 114. In this way, the method performs a fast and efficient key frame extraction.

Returning now to FIG. 5D, there is shown the extracted key frames for the video sequence used in FIGS. 5A to 5C. During the step 404, the second, fourth and fifth potential key frames have been removed using the above set of heuristic rules leaving the extracted key frames as shown. The removal step 406 in this example does not find any similar or repeated key frames and leaves the extracted key frames as shown. The method then decodes these extracted key frames to form the video summary of the video sequence.

Preferred Embodiment of Apparatus

Figure 6:
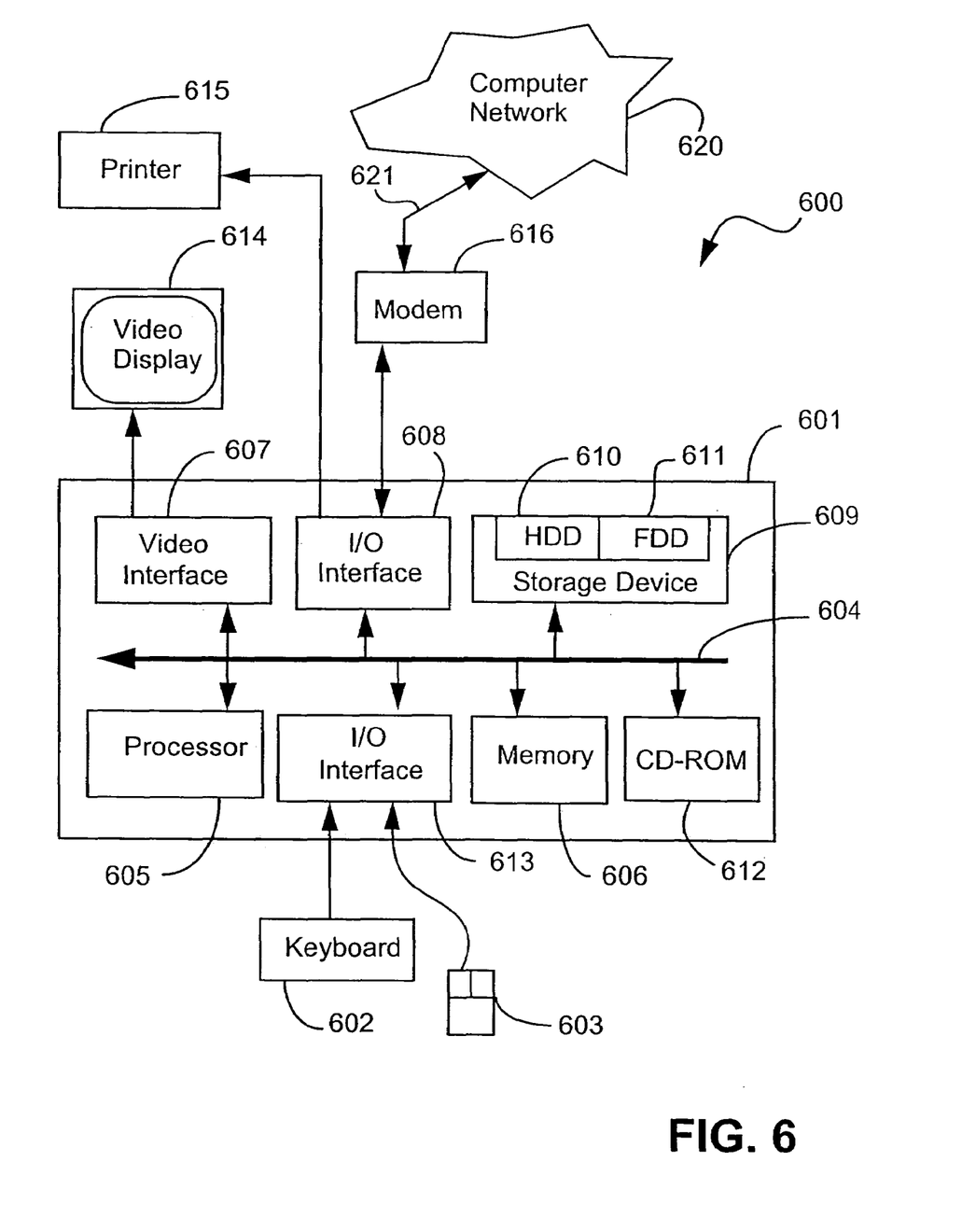
FIG. 6 is a schematic block diagram of a general-purpose computer upon which the embodiments of the present invention can be practiced.

The method of extracting key frames is preferably practiced using a conventional general-purpose computer system 600, such as that shown in FIG. 6 wherein the processes of FIGS. 6 may be implemented as software, such as an application program executing within the computer system 600. In particular, the steps of method of extracting key frames are effected by instructions coded as software that are carried out by the computer. The software may be divided into two separate parts; one part for carrying out the key frame extraction methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for extracting key frames in accordance with the embodiments of the invention.

The computer system 600 comprises a computer module 601, input devices such as a keyboard 602 and mouse 603, output devices including a printer 615 and a display device 614. A Modulator-Demodulator (Modem) transceiver device 616 is used by the computer module 601 for communicating to and from a communications network 620, for example connectable via a telephone line 621 or other functional medium. The modem 616 can be used to obtain access to the Internet, and other network systems, such as a Local Area Network (LAN) or a Wide Area Network (WAN).

The computer module 601 typically includes at least one processor unit 605, a memory unit 606, for example formed from semiconductor random access memory (RAM) and read only memory (ROM), input/output (I/O) interfaces including a video interface 607, and an I/O interface 613 for the keyboard 602 and mouse 603 and optionally a joystick (not illustrated), and an interface 608 for the modem 616. A storage device 609 is provided and typically includes a hard disk drive 610 and a floppy disk drive 611. A magnetic tape drive (not illustrated) may also be used. A CD-ROM drive or DVD drive 612 is typically provided as a non-volatile source of data. The components 605 to 613 of the computer module 601, typically communicate via an interconnected bus 604 and in a manner, which results in a conventional mode of operation of the computer system 600 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 610 and read and controlled in its execution by the processor 605. Intermediate storage of the program and any data fetched from the network 620 may be accomplished using the semiconductor memory 606, possibly in concert with the hard disk drive 610. In some instances, the application program may be supplied to the user encoded on a CD-ROM or floppy disk and read via the corresponding drive 612 or 611, or alternatively may be read by the user from the network 620 via the modem device 616. Still further, the software can also be loaded into the computer system 600 from other computer readable medium including magnetic tape, a ROM or integrated circuit, a magneto-optical disk, a computer readable card such as a PCM-CIA card, and information recorded on website servers and the like. The foregoing is merely exemplary of relevant computer readable mediums. Other computer readable mediums may be practiced without departing from the scope and spirit of the invention.

The computer system 600 has the capability to store large amounts of video data, which serves as input to the key frame extraction method. The video data may be input to the computer system 600 via a DVD-ROM drive 612 or directly via a camcorder (not shown) via input 608.

The method of extracting key frames may alternatively be implemented in dedicated hardware such as one or more integrated circuits performing the functions or sub functions of FIG. 1. Such dedicated hardware may be incorporated in a camcorder or VCR or such like, and may include graphic processors, digital signal processors, or one or more microprocessors and associated memories.

INDUSTRIAL APPLICABILITY

It is apparent from the above that the embodiment(s) of the invention are applicable to the video processing industries. The key frame extraction method has many applications, amongst which some are: visual identification of video content; video indexing; video browsing; and video editing. Returning now to FIG. 5D, there is shown the extracted key frames for the video sequence used in FIGS. 5A to 5C. During the step 404, the second, fourth and fifth potential key frames have been removed using the above set of heuristic rules leaving the key frames as shown.

The foregoing describes only one embodiment/some embodiments of the present invention, and modifications and/or changes can be made thereto without departing from the scope and spirit of the invention, the embodiment(s) being illustrative and not restrictive.

We claim:

1. A method of generating a representation of a video sequence, wherein said video sequence comprises compressed video data having block motion vectors, the method comprising the steps of:

decompressing the compressed video data to obtain said block motion vectors;

converting said block motion vectors to forward block motion vectors;

generating global motion signals based on the forward block motion vectors;

generating dominant global direction clusters based on said generated global motion signals;

selecting potential key frames of the video sequence using said generated dominant global direction clusters and a set of predefined rules;

removing redundant key frames from said selected potential key frames resulting in remaining selected key frames; and decompressing said remaining selected key frames to obtain said representation of the video sequence.

2. A method as claimed in claim 1, wherein said step of generating global motion signals comprise generating a pan global motion signal, a zoom global motion signal, and a tilt global motion signal.

3. A method as claimed in claim 1, wherein said dominant global direction clusters comprise one or more of a pan left, pan right, tilt up, tilt down, zoom in, zoom out and global still motion cluster.

4. A method as claimed in claim 1, wherein said step of generating dominant global direction clusters comprises the sub-steps of:

generating discrete global motion signals from said generated global motion signals;

removing noise from said generated discrete global motion signals; and generating dominant global direction clusters based on said discrete global motion signals from which noise has been removed.

5. Apparatus for generating a representation of a video sequence, wherein said video sequence comprises compressed video data having block motion vectors, the apparatus comprising:

means for decompressing the compressed video data to obtain said block motion vectors;

means for converting said block motion vectors to forward block motion vectors;

means for generating global motion signals based on the forward block motion vectors;

means for generating dominant global direction clusters based on said generated global motion signals;

means for selecting potential key frames of the video sequence using said generated dominant global direction clusters and a set of predefined rules;

means for removing redundant key frames from said selected potential key frames resulting in remaining selected key frames; and means for decompressing said remaining selected key frames to obtain said representation of the video sequence.

6. A computer readable medium comprising a computer program for generating a representation of a video sequence, wherein said video sequence comprises compressed video data having block motion vectors, the computer program comprising:

code for decompressing the compressed video data to obtain said block motion vectors;

code for converting said block motion vectors to forward block motion vectors;

code for generating global motion signals based on the forward block motion vectors;

code for generating dominant global direction clusters based on said generated global motion signals;

code for selecting potential key frames of the video sequence using said generated dominant global direction clusters and a set of predefined rules;

code for removing redundant key frames from said selected potential key frames resulting in remaining selected key frames; and code for decompressing said remaining selected key frames to obtain said representation of the video sequence.

* * * * *